July 30, 1968   F. REITER   3,394,647
APPARATUS FOR THE PRODUCTION OF WORT
Original Filed Dec. 26, 1962   5 Sheets-Sheet 1

July 30, 1968    F. REITER    3,394,647
APPARATUS FOR THE PRODUCTION OF WORT
Original Filed Dec. 26, 1962    5 Sheets-Sheet 4

July 30, 1968   F. REITER   3,394,647
APPARATUS FOR THE PRODUCTION OF WORT
Original Filed Dec. 26, 1962   5 Sheets-Sheet 5

3,394,647
APPARATUS FOR THE PRODUCTION OF WORT
Fritz Reiter, Waldkirch im Breisgau, Germany
Original application Dec. 26, 1962, Ser. No. 247,097, now Patent No. 3,249,443. Divided and this application Oct. 22, 1965, Ser. No. 508,415
Claims priority, application Germany, Dec. 30, 1961, R 31,792
10 Claims. (Cl. 99—278)

ABSTRACT OF THE DISCLOSURE

In an apparatus for the production of wort, a filter drum for the separation of the wort from the spent grains comprises suction means to draw the wort into the drum and means cutting the cake of spent grains accumulating on the periphery of the drum, while it is being sparged, into small readily extratced pieces.

---

This application is a division of my application Ser. No. 247,097, filed Dec. 26, 1962, now Patent No. 3,249,443.

This invention relates to an apparatus for the production of wort.

Wort is prepared from malted and/or other grain by mashing, sparging, and filtering. The conventional methods and apparatus for the production of wort for malt beverages are complicated; they require considerable time and produce frequently yields of low and varying extract content.

In accordance with the invention, the yield of wort is improved and the processing time is reduced by comminuting the malt grains to a fine grist, passing the fine grist through a continuously operated mashing plant, if necessary with continuous recycling, and by sparging the mash and extracting the wort while applying suction and filtering.

Preferably, the malt is ground, prior to mashing, to a particle size of 0.05 mm. the grist is subjected to a single or several successive mashing operations, and then wort is recovered by suction, and the spent grains are at the same time extracted. Thereby, the mash is, in the decoction process, after the first initial mashing operation, heated to saccharification and boiling temperature and cooked for a very short period of time. Subsequently, the final mash is prepared and then clarified by filtration.

The clarification is carried out by passing the mash onto the periphery of the drum of a continuous rotating suction filter where it is subjected sequently to drawing the wort extract inside the drum, sparging repeatedly the cake retained on the periphery of the drum with hot water, drawing off again the extracted wort, and finally removing the washed grains from the periphery of the drum.

Preferably, the drum covered by a fine screen turns in a vessel the lower trough-like portion of which contains the mash. Radial suction lines inside the drum draw the wort extract through the fine mesh screen towards the inside; cutting means act from the outside inwardly on the layer of residual solids remaining on the periphery of the fine mesh screen. and rinsing and sparging devices are provided to spray the mash on the screen. At the end of the thus provided extracting zone, there are means to take off and discharge the spent grains from the outer surface of the drum.

The invention will be described more in detail with reference to the accompanying drawings, where FIG. 1 is an illustrative representation of a wort production plant in accordance with the invention;

Figure 1:
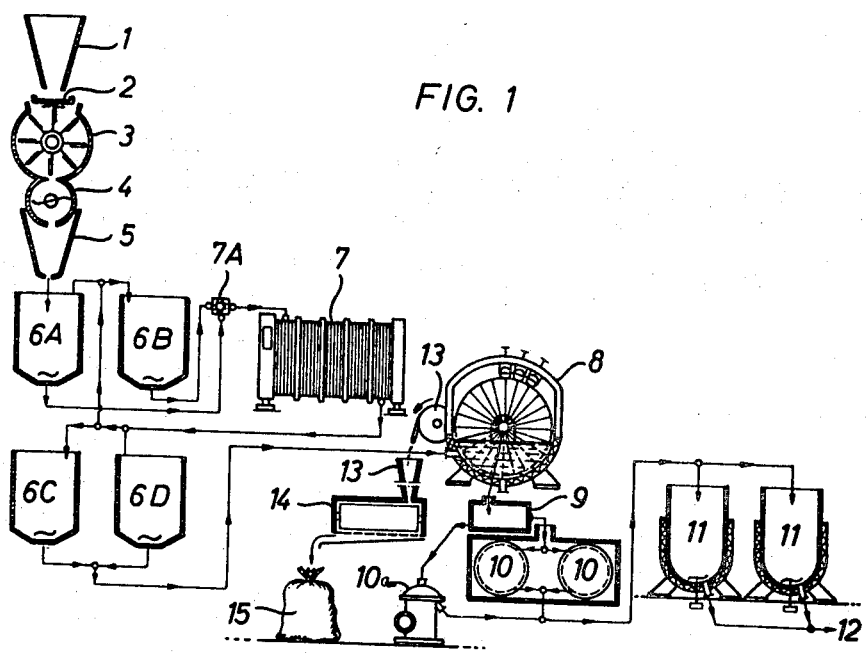

Referring now to the drawings and to FIG. 1, the reference numeral 1 designates the malt silo, and 2 the scales for the malt; 3 is a fine grist mill for the malt and 4 is a mixer for mixing the malt with cold or warm water. Instead of the mixer 4, a malt grist silo 5 may be used, whereby the mashing is done directly.

6A, 6B, 6C and 6D are four vessels for the mashing operation, which are equipped with agitating means and combined to a unit. Pipes with suitable valves connect the vessels with each other and with a circulating pump 7A and a heating device 7 for the mash in form of a plate heater or the like. 6A is a mash storage and mixing vessel with stirrer; a pipe connects the vessel 6A with the circulating pump 7A and from there to the heating device 7 in which the mash mixture, during passage, is brought to the desired saccharification temperature, whereupon it is transferred to the vessel 6B. Instead of the illustrated four mash vessels, only two or more may be used.

The saccharified and cooked mash is passed by the circulating pump 7 and through the plate heater 7, alternately to one of the final mash vessels 6C or 6D, which are also equipped with agitators, and the final mash is then passed to the rotating drum suction filter 8. Instead of stirring members, each vessel 6A, 6B, 6C, and 6D may be provided with an individual circulating pump and suitable piping. The vessels are charged continuously at time intervals corresponding to the various mashing operations whereby the various shutoff and by-pass valves, which may be represented by multi-way stopcocks, are either manually controlled or automatically by time switches in predetermined intervals.

In view of the fine comminution of the malt to fine grist, it is also possible to pass from the iodine normal saccharification without boiling directly to the final mashing operation. In this way, a continuous mash process is obtained. In the apparatus described (6A–D, 7, 7A), the time required for a continuous mash process, with or without boiling, at the respective desired adjustable mash and saccharification temperatures is about 50 to 60 minutes.

The tubs 6A–6D are jacketed for heating with steam or hot water, provided with a vapor tight hood or covers, and equipped with sampling cocks, thermometers, and the like. Connected to the mash tub block 6A–6D, there is a rotating drum suction filter 8, the drum of which is arranged in a vessel in such a way that it dips into the mash contained in the lower trough-like part of the vessel. Through the hollow shaft of the vacuum filter drum and radial suction pipes, a strong suction effect is exerted to extract the wort. Distributed over the outer periphery of the rotating drum above the surface of the mash contained in the trough-like portion of the heatable drum vessel, there are sprays with outlet nozzles for atomized extracting liquid, for instance hot water, which sparges the filter cake formed on the screen of the drum 8.

In order to produce a larger surface for spraying and extracting, I provide cutting and severing means along the periphery of the drum for radial action on the solid residues held by suction on the outer surface of the drum. After termination of the wort extraction, the remaining filter cake is, shortly before the drum periphery dips again into the mash, lifted from the drum surface by scraper means 13, which rotate in the opposite direction, and conveyed to the drier 14 from which the brewers' grains are filled into bags 15 for use as animal feed.

The wort drawn off through the hollow shaft and the radial suction pipes passes through a wort buffer tank 8, kieselguhr filters 10 into coppers 11, and from there, after addition of hops or other adjuncts, as finished wort into additional stages 12 of the beer breweing process. There is always only one filter in operation while the other is cleaned. The coppers 11 are alternately filled and emptied. Instead of a kieselguhr filter 10, a separator 10a may be used.

The bottom of the trough of the perforated rotatable drum filter is equipped with a jacket for heating.

Figure 2:
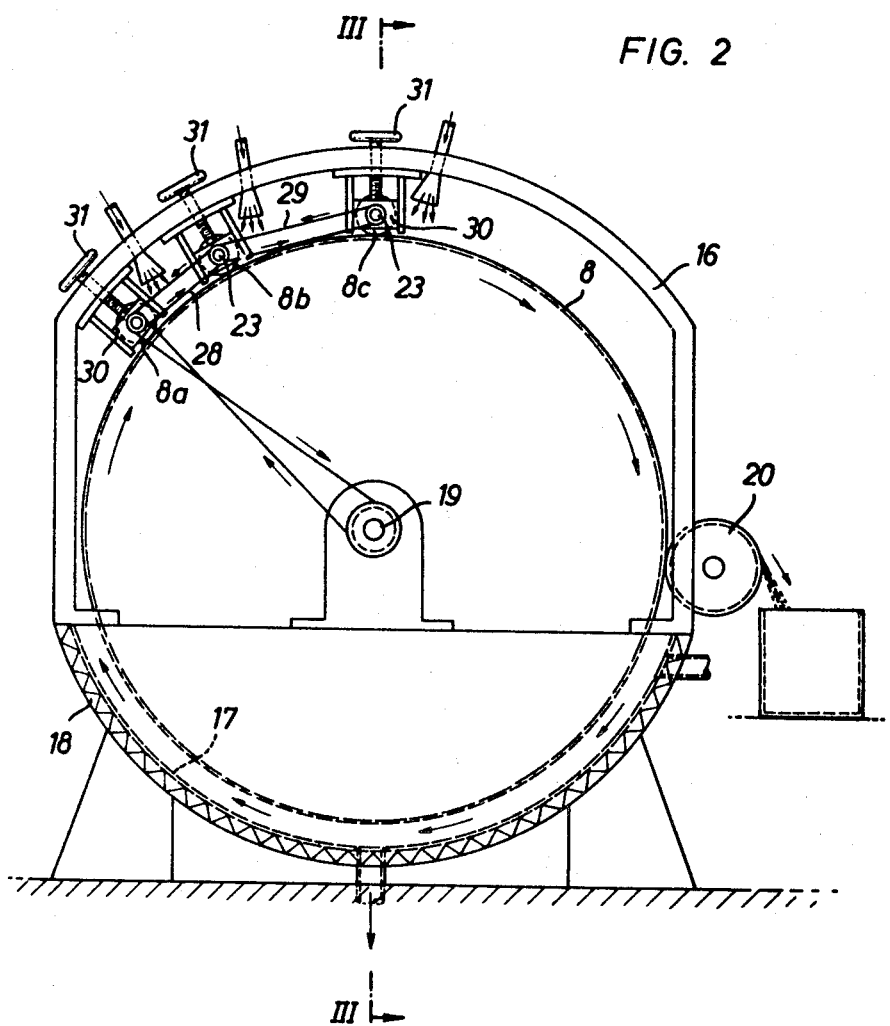
FIG. 2 is a side view, partly in section, of a rotary suction filter according to the invention.
Figure 3:
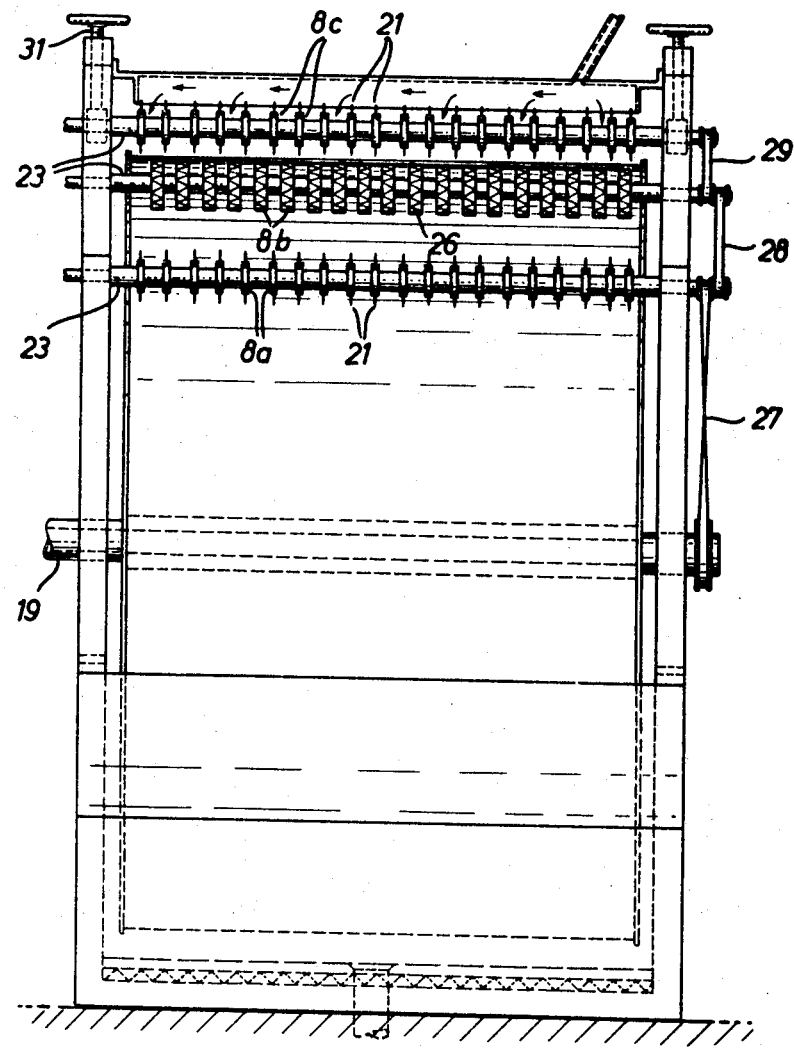
FIG. 3 is a sectional view of the filter of FIG. 2, taken along line III—III of FIG. 2.

The rotary drum suction filter shown in FIGS. 2 and 3 comprises a perforated drum 8 in a vessel 16 having a bottom portion 17 conforming to the periphery of the drum 8; said bottom portion is equipped with a heating jacket 18 and receives the mash, into which the revolving drum 8 dips with its lower part. Radial suction tubes or channels lead from the periphery of the drum to the hollow rotating shaft 19 which is connected to a vacuum source.

The wort drawn off through the hollow rotating shaft 19 is passed into the subsequent treatment stages. The spent grains remaining on the periphery of the filter drum after recovery of the wort are subjected, during the slow rotation of the drum, to spraying or sparging with an extracting liquid, such as hot water, supplied from nozzle-like outlets. At the same time, the layer of spent grains on the periphery of the rotary filter is divided by means of radially acting cutting and dividing means in many small pieces of large surface, so as to extract better the wort absorbed at the surface of the grain cake by means of the atomized liquid sprayed thereon and to draw it off towards the center of the rotary drum 8.

The cutting means roll on the periphery of the drum in the same direction and at the same rate of speed as the drums so as to prevent the chopped grain particles from gliding off the drum. Several cutting means are provided one behind the other in staggered axial relationship.

By alternately using parallel disc cutters and cutters with zigzag or curved edges the layer of solid matter on the drum is thoroughly chopped into small segments.

After the grains have been been completely extracted by means of the sprayed extracting liquid, the remaining filter cake is taken off by the drum 20 which revolves in the opposite direction as drum 8.

Figure 4:
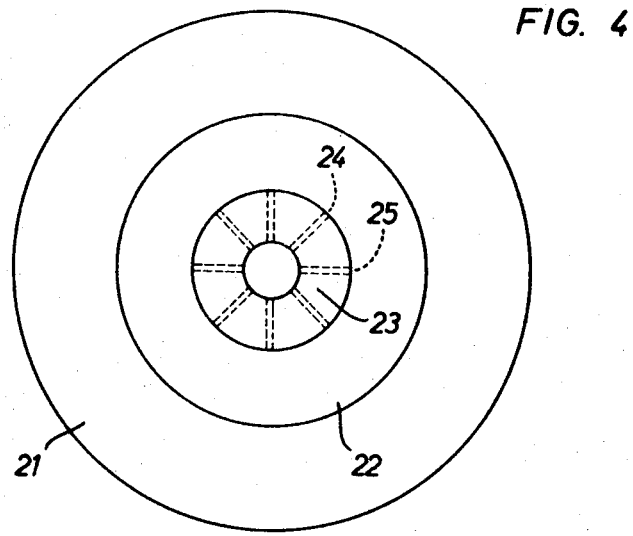
FIGS. 4 and 5 are side and plan views of the cutting means associated with the suction filter.
Figure 5:
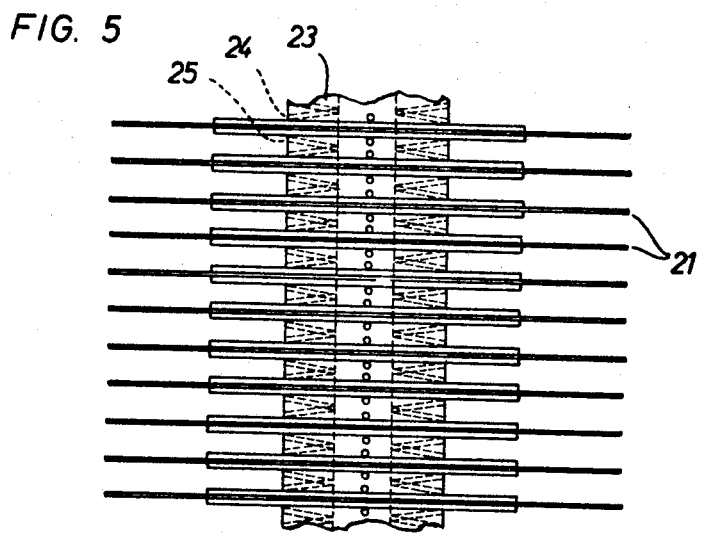

In FIGS. 4 and 5, an embodiment of a cutter device is shown which comprises parallel disc cutters 21, supporting discs 22, and a hollow supporting shaft 23 provided with spray channels 24, 25 arranged inclined to the radial direction.

Figure 6:
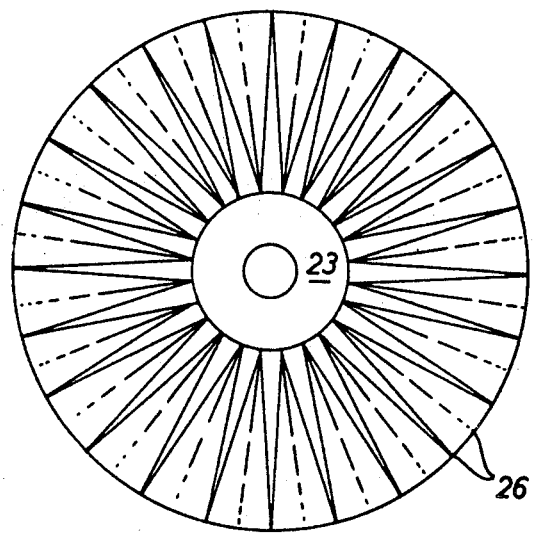
FIGS. 6 and 7 are side and top plan views of another embodiment of the cutting means of the invention.
Figure 7:
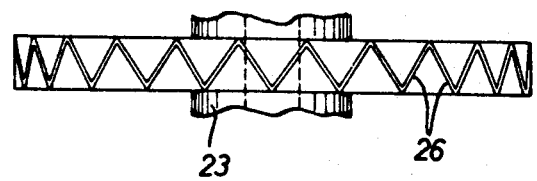

In the embodiment of the cutter means shown in FIG. 6 and 7, the cutting knives are equipped at their outer periphery with zigzag edges 26 which cut the solids on the filter drum and chop them to small particles which are sprayed with the warm water and washed. The sprayed liquid may be admittted through the hollow shaft 23 of the cutter or through spraying devices arranged above the cutters.

The cutting blades 21 are rigidly joined to shaft 23 by welding, pressfit, or in any other suitable manner.

The shafts 8a, 8b, 8c of the cutters are driven at the same rotational speed and in the same direction as the drum 8 by means of a crossed belt drive 27 connecting the drum shaft 19 and the shaft 8a, from which latter shaft the other cutter shafts 8b, 8c are driven by belt drives 28, 29.

The cutter shafts are journaled in supports 30 which can be radially adjusted in guide-ways by means of threaded spindles 31 so as to space the cutters at the required small distance from the drum to prevent injury to the screen surface of the drum but effect thorough cutting of the filtered grains.

I claim:

1. An apparatus for producing wort comprising a vessel for storing and mixing the mash, a vessel for saccharifying and boiling the mash, and two mashing-off vessels for alternate use, said four vessels being combined to a unit, a circulating pump, a heating device, line connecting said vessels with each other and with said pump and heater, and control means in said lines.

2. In an apparatus for the production of wort, in combination with mash tubs, a tank, the lower portion of said tank forming a trough receiving finished mash from said tubs, conduit means connecting said tubs and trough, a rotary perforated drum filter dipping with its lower portion into said mash, radially arranged suction means inside said drum for drawing wort inwardly into the drum, cutting means arranged for acting radially from the outside towards the inside on the solids accumulating on the periphery of the drum, sparging means for spraying liquid on the periphery of the drum in the zone acted upon by said cutting means, and means removing the cut and sparged solids from the periphery of the drum.

3. A device as claimed in claim 2 wherein the cutting means rotate in the same direction and at the same speed as the drum.

4. A device as claimed in claim 3 wherein said cutting means have zigzag shaped edges.

5. A device as claimed in claim 3 wherein the cutting edges of the cutting means have a profile which is curved in the direction of the periphery.

6. A device as claimed in claim 3 comprising a hollow shaft supporting said cutting means, said shaft having radial nozzle-like outlet openings between adjacent cutting means for spraying sparging liquid admitted through the hollow shaft.

7. A device as claimed in claim 6 wherein said outlets are inclined bores directed against the lateral faces of the cutting means.

8. A device as claimed in claim 6 comprising adjusting means for radial adjustment of the cutting means and their shaft with respect to the surface of the drum.

9. A device as claimed in claim 2 wherein said cutting means comprise at least one row of cutting discs having straight edges arranged in the direction of rotation of the drum, and at least one row of cutters having edges shaped differently from the edges of said cutting discs.

10. A device as claimed in claim 2 comprising shafts supporting said cutting means and means driving said shafts at the same speed and in the same direction as said drum.

References Cited

UNITED STATES PATENTS

| 1,922,730 | 8/1933 | Gore et al. | 99—278 X |
| 2,082,222 | 6/1937 | Siebel | 99—278 X |

FOREIGN PATENTS 283,039  9/1952  Switzerland.

OTHER REFERENCES

German printed application 1,017,902, 10/1957.

WILLIAM I. PRICE, *Primary Examiner.*